June 19, 1923.
C. D. SCOTT
SCALE
Filed May 31, 1921
1,459,188
2 Sheets-Sheet 1
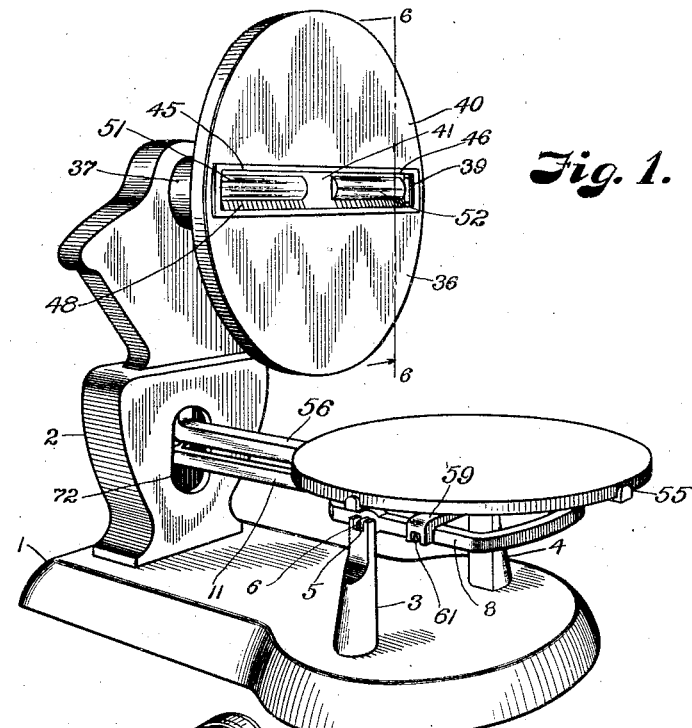
Fig. 1.
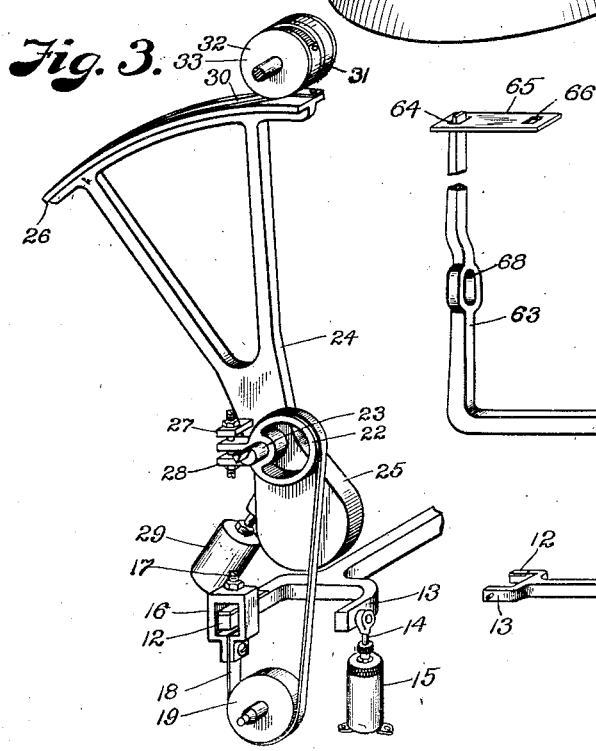
Fig. 3.
Fig. 4.
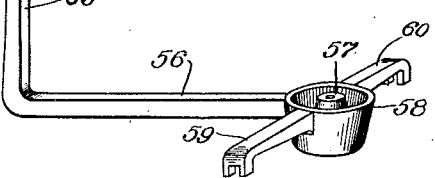
Fig. 5.
INVENTOR
Charles D. Scott.
BY Arthur C. Brown
ATTORNEY June 19, 1923.
C. D. SCOTT
SCALE
Filed May 31, 1921
1,459,188
2 Sheets-Sheet 2
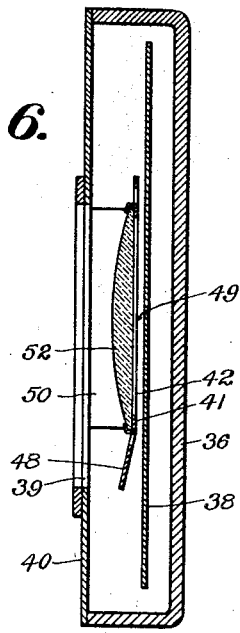
Fig. 6.
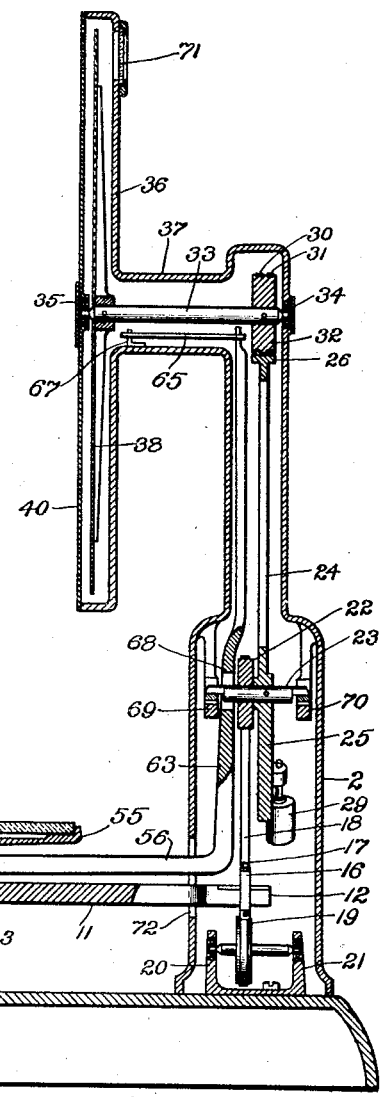
Fig. 2.
Fig. 7.
INVENTOR
Charles D. Scott.
BY Arthur C. Brown
ATTORNEY Patented June 19, 1923.

1,459,188

UNITED STATES PATENT OFFICE.

CHARLES D. SCOTT, OF TOPEKA, KANSAS, ASSIGNOR TO THE SCOTT WEIGHING MACHINE CO., OF TOPEKA, KANSAS, A CORPORATION OF KANSAS.

SCALE.

Application filed May 31, 1921. Serial No. 473,829.

*To all whom it may concern:*

Be it known that I, CHARLES D. SCOTT, a citizen of the United States, residing at Topeka, in the county of Shawnee and State of Kansas, have invented certain new and useful Improvements in Scales; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to weighing scales and particularly to a novel arrangement and construction of parts wherein the counterbalancing poise for the scale beam is provided with a flexible tape, so associated therewith that the nose of the beam or lever will move upwardly during the weighing operation instead of downwardly, as is ordinarily the case, thus eliminating the cumbersome and unwieldy major weight in the heel of the scale levers now in use.

More particularly the invention consists of locating the scale pan on the opposite side of the fulcrum of the scale lever from the nose and operating through a flexible tape and idler onto an eccentric cam on the poise, thus making it possible to provide lighter construction by eliminating the major weight.

A further object of the invention is to provide means for rotating the chart through a frictionless arrangement consisting of oppositely disposed tapes connected to the chart mounting and to a segment on the poise in such a manner that lost motion is entirely eliminated and the chart caused to move positively in either direction in resonance with the poise. This construction eliminates the well known rack and pinion method of rotating a chart and abolishes the constant annoyance of lost motion and friction always present in the old type of scales.

Still another object of my invention provides for a particularly novel arrangement of parts whereby the steel yard is extended upwardly from the scale pan to a greater distance than is ordinarily the case to secure greater accuracy in the check for maintaining the scale platform level during the weighing operation.

I desire to use this construction in order to minimize the angle of lost movement of the check with respect to the scale pan, thereby making it possible to weigh an article at any point on the scale pan to a high degree of accuracy without the necessity of extreme precision in the manufacture of the parts which would otherwise be necessary if the shorter arm were used.

It is well known to those skilled in the art of scale manufacture that greater accuracy can be obtained if the check is removed to a greater distance from the scale pan and by the particular arrangement of parts shown in the present invention, it is clearly apparent that I have accomplished this feature with a minimum number of parts and that the particular location of the check not only makes for a more rigid construction but simplifies the process of sealing the scale and eliminates the variation of weights caused from locating the commodity to be weighed in different position on the pan.

My invention also contemplates the provision of an indicating chart which will indicate the aggregate cost of merchandise placed upon the scale platform or pan and which co-operates with a novel form of guard or shield that covers parts of the chart in order that other parts thereof may be easily and quickly read.

The novel construction is specifically described hereinafter, reference being had to the accompanying drawings, in which—

Fig. 1 is a perspective view of a scale constructed in accordance with my invention.

Fig. 2 is a vertical, longitudinal, sectional view through the same.

Fig. 3 is a detail perspective view of the scale lever poise and part of the scale lever.

Fig. 4 is a detail perspective view of the pan level maintaining lever.

Fig. 5 is a reduced detail perspective view of the scale lever.

Fig. 6 is a sectional view on the line 6—6 of Fig. 1, and

Fig. 7 is an enlarged detail view of the dial exposing mechanism.

The base 1 is provided with an enclosing casing 2, in which the operating mechanism of the scale is enclosed and with spaced pivot supporting posts 3 and 4. The posts are provided with bearing notches 5, in which are received the trunnions 6 and 7 on the side bars 8 and 9 of the yoke-shaped, pan-supporting heel 10 of the lever 11. The nose of the lever is bifurcated to provide the fingers 12 and 13, one of which is connected to the movable element 14 of a dash pot 15, which serves as a check, as will be well understood. The other finger 12 is connected to an adjustable anchor or fastening device 16 (see Fig. 3), which is provided with an adjusting screw 17 adapted to bear on top of the finger 12 whereby tension may be provided on the tape 18 to which the member 16 is connected.

The tape 16 passes around an idler 19, journaled in bearings 20 and 21, supported upon the base 1 and said tape passes between the fingers 12 and 13 and over an eccentrically mounted ring 22, which constitutes a cam rigid on the shaft 23, which carries fixed thereto a counterbalanced segment 24, having a weight or lobe 25 below the shaft and a segmental rim 26 at the upper end thereof. The cam 22 is adjustably held between the lugs 27 and 28, carried by the segment 24 and the lobe 25 of the segment is provided with an auxiliary counterbalance 29, which may be adjusted with relation thereto to effect a proper counterpoise between the segment 24 and the pan or platform supported by the heel of the lever 11.

The rim 26 of the segment 24 carries two oppositely directed tapes 30 and 31, oppositely wound around the pulley 32 on the dial shaft 33, mounted in a bearing 34 at the upper portion of the casing 2 and in a bearing 35 at the front of the dial case 36, which is connected to the casing 2 by the tubular portion 37 (see Fig. 2).

The tapes 30 and 31 wind on the pulley 32 in opposite directions so that when one tape is winding, the other is unwinding and vice versa. Therefore, there will always be a tendency to restore the shaft 33 to its original position and return the dial 38, rigid therewith, to its original or normal position so that zero calibrations will always be presented through the sight opening or slot 39 in the face 40 of the dial casing 36.

The sight opening 39 is provided with a panel 41, having a plurality of parallel segmental slots 42, by means of which the calibrations on the dial 38 may be observed. The panel is provided with comparatively wide openings 42 so as to increase the visibility of the calibrations on the dial 38 and partially cover adjacent calibrations, it being understood that the calibrations are arranged in two rows 43 and 44, those designated 43 being readable through the portion 45 of the slot and those designated 44 being reading through the portion 46 of the sight opening 39. The spacing bars 47 will cover one set of calibrations and expose the other. In the present instance, the bars 47 cover 44 (see Fig. 7) and the calibrations 44 are shut off from view. On the opposite side of the disk, however, the bars corresponding to 47 will cover 43 and expose 44. The purpose of providing the double row of calibrations, however, is disclosed in a separate application directed specifically to that particular form of chart.

It will also be observed that a price bar or indicator 48 may be provided with numbers opposite each slot or opening 42 to indicate the price at which the calibration is to be made in that particular slot and that the sum total can be read by an indicating line or wire 49 (see Fig. 7).

The panel 41 is connected to the front panel 40 of the disk casing 36 by wings or projections 50 in a well known manner and across the exposed portion of the dial and fastened to the panel 41 are lenses or magnifying glasses 51 and 52, which may be held to the panel 41 by the struck-up ears or fingers 53 and 54, as will be clearly seen by reference to Fig. 7.

The scale pan 55 is not supported directly upon the heel of the lever 11 but is carried by a separate scale pan support consisting of an overhead check comprising a link 56, at the heel end of which is a pan supporting stud 57, surrounded by a cup 58 into which shot or balancing elements may be introduced in order to balance up the scale. Projecting in opposite directions from the supporting cup are arms 59 and 60, which engage the knife-edged extensions 61 and 62 on the arms 8 and 9 of the yoke-shaped heel 10 of the lever 11, so that there is a rocking connection between the arms 59 and 60 and the knife-edged bearings 61 and 62. The nose end of the lever 56 is provided with a steel yard upstanding arm 63 having its extremity loosely projecting through the end 64 of a slotted plate 65, the opposite end of the plate 65 being provided with a slot 66, which engages a finger 67 supported by the floor of the tubular portion 37 of the scale.

In actual practice it is desired to so construct the link 57 and its appertenances that the distance between the pivotal connections 61 and 62 for the scale pan support and the trunnions 6 and 7 for the lever 11 will be equal to the distance between the slots 64 and 66 so that when weight is applied on the pan, there will be what I term a "parallel motion" imparted to the scale pan because the scale pan will move downwardly in a level condition under the weight of the merchandise and will not permit it to tilt. Therefore, the lever 56 and its connections constitute a scale pan leveling means for maintaining the scale pan in a level condition at all times. This is due to the fact that the arms 59 and 60 rock slightly upon the knife-edged pivots 61 and 62 and due to the fact that the plate 65 constitutes a rocking link between the fixed finger 67 and the upper end of the arm 63, it being observed that the arm 63 is provided intermediate its ends with a loop 68, surrounding the shaft 23 on which the cam or eccentric rim 22 is mounted.

The shaft 23 is supported in bearings 69 and 70, carried by the casing 2, within which rests the bearings 20 and 21, the counter poise, the tape 18 and the pulley 32 with its co-operating tapes 30 and 31.

It will be apparent by reference to the drawings that the casing 2 encloses the major portion of the scale operating mechanism and that the chart mechanism may be formed integral therewith if desired, the latter being provided with an opening 71, through which the reverse side of the chart 38 may be observed, the chart being preferably provided with certain indicia to be read therethrough.

As heretofore intimated, the pan leveling mechanism is an important feature of my invention and it is further of prime importance to provide the connection between the toe of the lever 11 and the tape 18 (which I prefer to make of steel) because by mounting the lever 11 as shown and connecting the tape thereto, a direct down pull is exerted on the tape by the cam or eccentric wheel 22, exerting a down pull on the shaft 23 to swing the segment 24 about its pivot, thereby simplifying the construction and making a more rugged scale mechanism than is usually found in scales now generally employed.

It is also an important feature of my invention to provide the mechanism for conveniently swinging the chart 38 about its axis, thereby eliminating noise, friction and inaccuracies not uncommonly encountered with a rack construction of motion transmission.

It is also to be observed that the front of the case 2 is provided with a suitable opening 72, through which the levers 11 and 56 may extend into the casing 2.

What I claim and desire to secure by Letters-Patent is:

1. In a scale, a base, a lever pivoted on the base, a segmental counterbalance, a flexible connection between the counterbalance and the nose of the lever, a rotatable shaft, a pulley thereon, oppositely wound tapes around the pulley and connected to the segmental counterbalance, and a chart carried by said shaft.

2. In a scale, a base, a pivoted lever on the base, a scale platform or pan carried by the heel of the lever, a counterbalance adjacent to the nose of the lever, a flexible connection between the nose of the lever and the counterbalance whereby movement of the lever will impart movement to the counterbalance, a segmental rim on the counterbalance, a pulley, a flexible connection connected to one end of the segment and in winding relation with the pulley, a flexible connection secured to the other end of the segment and in winding relation to the pulley in an opposite direction to the first mentioned connection, a shaft on which the pulley is supported, and a chart carried by the shaft.

In testimony whereof I affix my signature.

CHARLES D. SCOTT.